United States Patent
McCord et al.

(10) Patent No.: US 6,284,975 B1
(45) Date of Patent: Sep. 4, 2001

(54) DIVIDER FOR RACEWAY TEE ASSEMBLY

(75) Inventors: Kent R. McCord, Granby; Christopher R. Throwe, Bristol, both of CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 09/334,245

(22) Filed: Jun. 16, 1999

(51) Int. Cl.$^7$ ..................................................... H02G 13/00
(52) U.S. Cl. ............................................ 174/71 R; 174/49
(58) Field of Search ........................... 174/71 R, 49, 174/72 C, 72 R, 101; 138/157; 52/287.1

(56) References Cited

U.S. PATENT DOCUMENTS 4,612,746 * 9/1986 Higgins ..................................... 174/49
5,469,893    11/1995   Caveney et al. .
5,753,855    5/1998    Nicoli et al. .
5,917,982    6/1999    Vargas et al. .

OTHER PUBLICATIONS

"Multichannel, Single or New Twin Snap Surface Nonmetallic Raceway", 1998 no month p. 1–6 no author.

* cited by examiner

Primary Examiner—Shawn Riley
(74) Attorney, Agent, or Firm—McCormick, Paulding & Huber LLP

(57) ABSTRACT

A tee assembly for use between horizontal raceway sections and a vertical raceway has a divider that separates the cables running between separate wireways in these raceways. The divider has unique ramps to guide fiber optic cables around generous radii, and is also reversible to lend a degree of flexibility to the divider.

12 Claims, 5 Drawing Sheets

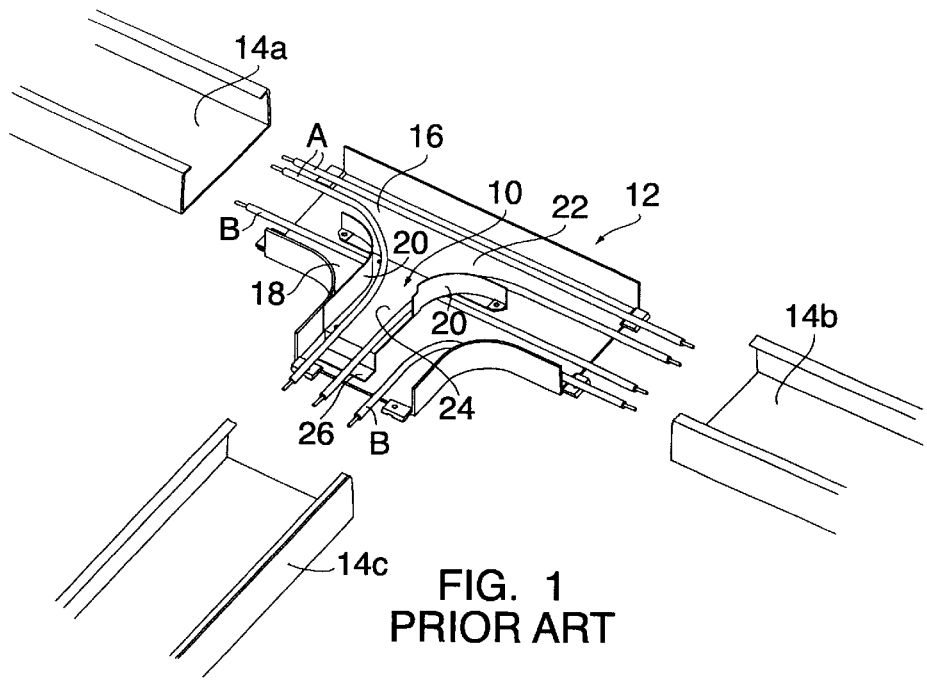
FIG. 1
PRIOR ART
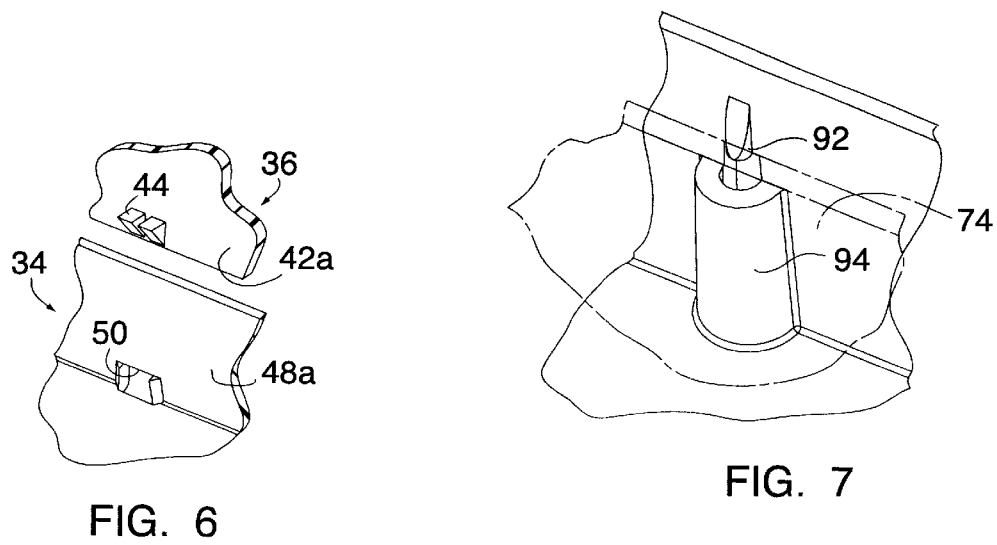
FIG. 6
FIG. 7

DIVIDER FOR RACEWAY TEE ASSEMBLY

BACKGROUND OF THE INVENTION

This invention relates generally to a tee assembly for use in a raceway system that provides wire and cable management for data, power, audio, and video applications. More specifically, the invention allows for routing power cables and communications cables through the same raceway with both power and communications cables being routable straight through the tee assembly and through a 90 degree bend while maintaining separation between the power and communications cables.

Tee assemblies have traditionally provided raceways with the capability of routing cables or wires both straight and at 90 degree bends through the same raceway system at the same location in the raceway system. This multi-directional capacity has provided efficient space management by minimizing the space that normally would be taken up by the multiple, separate raceway systems required to rout cables in varying directions.

Combining multiple cable routs within the same raceway has its limitations. The UL National Electric Code (NEC) requires power cables to be kept separate from communications cables when installed in raceway systems. Accordingly, raceway ducts and tee assemblies are provided with dividers which separate the power cables from the communications cables. It is often the case, however, that interior office spaces need to be wired for both power and communications-based operations, and thus requiring both power cables and communications cables to be routed to the same locations within the same interior office space. Thus, power cables need to be routed both straight and branched, and communications cables need to be routed likewise. Accordingly, a raceway, likely incorporating a tee assembly, having multiple wireway capacity is most efficient for the job. However, in order to maintain the design and space saving benefits that tee assemblies provide, while maintaining compliance with UL NEC requirements, the power and communications cables must be routed in multiple directions without commingling or entangling the cables.

To prevent commingling or entangling, typical prior art raceway system tee assemblies incorporate a bridge device 10, as shown in FIG. 1. A raceway system having a tee shaped assembly 12 (depicted in FIG. 1 as a base fitting) accommodates linear raceway base members 14a, 14b, and 14c. Raceway members 14a and 14b are aligned along the top of the tee, while the third raceway member 14c is perpendicularly positioned with relation to the first two raceway members 14a and 14b. The bridge 10 is positioned in the tee assembly base fitting 12, and allows power cables A from a first wireway 16 to be routed over communications cables B routed through a second wireway 18, where it is desired that a portion of the communications cables B be routed through the perpendicularly positioned raceway member 14c of the raceway system.

The bridge 10 has a funnel shaped configuration with opposed side walls 20, 20 that are curved to define a funnel shape allowing power cables A to be routed in an arcuate fashion from raceway member 14a and/or raceway member 14b to raceway member 14c. A space 22 is provided behind the bridge device 10 and defines a straight through passageway for power cables A extending between the axially aligned raceway members 14a and 14b. Communications cables B may similarly be routed through the tee assembly 12—i.e., either bent or straight—however, communications cables B merely use the tee assembly base fitting 12 as a guide.

A significant disadvantage of the prior art bridge device 10 is that cable capacity through the bend of the tee assembly is greatly reduced, typically by 50% or more, attributable to the decreased cross-section through the funnel-shaped portion of the bridge. Thus, the cable capacity of the entire raceway system is restricted by the limitations of the tee assembly—i.e., the number of cables routed through the entire raceway system is dependent upon the number of cables that can be accommodated through the bend of the tee assembly. In order to increase the cable capacity of a raceway system with a tee assembly incorporating a bridge device, a tee assembly with a larger cross-sectional capacity is required (i.e., increasing the cross-section of the wireways at the bend portion of the tee assembly), which would protrude out from the raceway. This is undesirable in situations where the raceway system should be discrete and use as little office space as possible.

Another disadvantage of the prior art bridge device 10 is the lack of a smooth transition for cables being routed from a linear raceway member 14a over the bridge 10 and into another linear raceway member 14c. The prior art bridge 10 is provided with a flat planar section 24 supported at an intermediate position between the base surface and the top surface by sidewalls on each side of the planar surface. Thus, a cable B running adjacent the base surface of the tee assembly must not only be bent through the funnel-shaped portion of the bridge, but it must be contorted upwardly into order to pass across the planar surface 24 of the bridge 10. Cables with less flexibility are less likely to follow a path through a raceway that takes up a minimal cross-sectional space when they are subjected to multiple contortions and bends within a relatively small segment of the cable. Accordingly, bridge devices that require the cables to "step-up" and "step-down" in order to pass across the bridge device having proven undesirable where maximization of the cross-sectional capacity of a raceway is preferred.

U.S. Pat. No. 5,753,855 to Nicoli et al. attempts to alleviate the drawbacks of the bridge device shown in FIG. 1, by expanding the width of the funnel-shaped portion. However, the Nicoli et al. bridge device does little to overcome the step transition drawback typical of the prior art bridge devices.

Another disadvantage of prior art bridge devices is that they often must be secured to the tee assembly and provide little flexibility of use. Most bridges must be smaller than the tee assembly so as to leave channel space for multiple wireways. To prevent shifting within the assembly, the bridge is often welded, screwed or bolted to the assembly (as shown in FIG. 1 by bracket 26). Alternatively, the bridge is provided with sidewalls that run flush with the sidewalls of the tee assembly to restrict lateral shifting of the bridge (as disclosed in Nicoli et al.).

Many prior art tee assemblies also have not proved suitable for accommodating fiber optic cable. Fiber optic cable cannot accommodate a bend radius of less than 2 inches when routed through a bend of a tee assembly. Such cable can be damaged when routed through a bend having a sub-optimal radius of curvature. Thus, certain bridge designs whereby fiber optic cables may be contorted through sharp angles due to limited use of the space within the tee assembly have proved undesirable.

The chief aim of the present invention is to provide a tee assembly which is not only capable of accommodating fiber optic cable with no more than a two inch radius bend, but which can separate wires routed through the assembly without significantly reducing the cable capacity of the raceway system.

SUMMARY OF THE INVENTION

In accordance with the present invention, a tee assembly is provided to be used in a raceway system for routing cables in an environment that requires the cables to undergo bends of 90 degrees. In its presently preferred form, the tee assembly accommodates cables that may be routed through the bend, but additionally allows for other cables to be routed straight-through the same tee assembly without entangling the cables.

It is an object of the present invention to provide a tee assembly wherein the drawbacks of the prior art are avoided. Accordingly, the present invention incorporates a tee section divider which maintains separation of cables in accordance to the UL NEC requirements without reducing the cable capacity of the wireways it separates and defines. In its preferred embodiment, the tee section divider has a central portion which substantially spans a diverging portion of the tee assembly, providing ample space for cables to be routed straight through the tee assembly or at a 90 degree bend, and flared ramps located on the three ends of the tee section divider, providing a gradual transition for cables routed through the tee assembly of the present invention. Moreover, the tee assembly divider of the present invention provides great flexibility in use, specifically facilitating construction of raceway systems in the field.

DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1 shows the prior art bridge device commonly used in raceway tee assemblies.

FIG. 6 is a perspective view of the means for securing the cover fitting to the base fitting.

FIG. 7 is a perspective view of the means for detachably securing t he divider into the base fitting as shown in FIG. 2.

DETAILED DESCRIPTION OF THE PREFERRED EMBODIMENT

Figure 2:
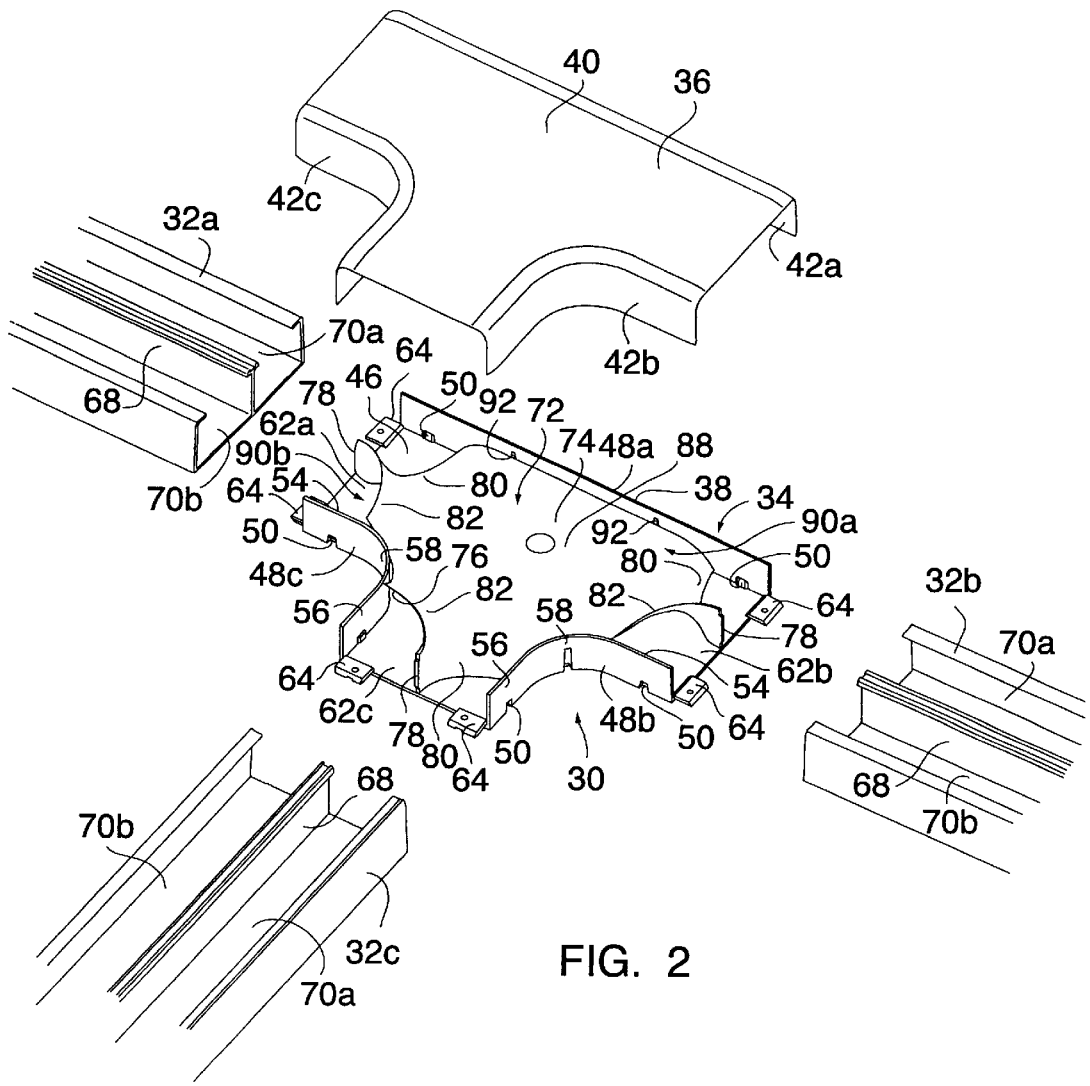
FIG. 2 is a perspective view of a raceway system in the process of assembly incorporating three linear raceway sections, a tee assembly base fitting, a tee assembly cover fitting, and the tee assembly divider of the present invention positioned in the base fitting.

Turning now to the drawings in greater detail, FIG. 2 illustrates the tee assembly 30 constructed in accordance with the present invention. Tee assembly 30 is capable of accommodating perpendicular linear raceway members 32a, 32b, and 32c, with raceway members 32a and 32b being axially aligned along the head of the tee and raceway member 32c being perpendicularly positioned thereto along the stem of the tee.

A housing 34 is preferably formed from attaching a cover fitting 36 to a base fitting 38. Cover fitting 36 comprises a top surface 40 and first, second, and third cover sidewalls 42a, 42b and 42c respectively, with first cover sidewall 42a generally being straight while second and third cover sidewalls 42b and 42c are generally curved or arcuate, preferably having radii of curvature of at least two (2) inches.

Cover fitting 36 is provided with a plurality of inwardly protruding clip members 44, 44 (as shown in FIG. 6) located on the cover sidewalls 42a, 42b, and 42c at the portion of said sidewalls removed from the top surface 40 of the cover fitting 36.

Base fitting 38 comprises a base surface 46 and first, second and third base sidewalls 48a, 48b and 48c respectively, with first base sidewall 48a generally being straight while second and third base sidewalls 48b and 48c are generally curved or arcuate, preferably having radii of curvature of at least two (2) inches.

Base fitting 38 is provided with a plurality of holes or notches 50, 50 located on the base sidewalls 48a, 48b and 48c adjacent the base surface 46. Holes 50 are aligned with clip members 44 such that when cover fitting 36 is fitted over and around base fitting 38, clip members 44 engage holes 50 and secure cover fitting 36 to base fitting 38. When cover fitting 36 is attached to base fitting 38, first, second and third cover sidewalls 42a, 42b and 42c overlap and are held flush with first, second and third base sidewalls 48a, 48b and 48c, respectively, effectively creating first, second and third housing sidewalls 52a, 52b and 52c (not shown). From here on, discussion of the first, second and third housing sidewalls 52a, 52b and 52c applies to the first, second and third cover sidewalls 42a, 42b and 42c and the first, second and third base sidewalls 48a, 48b and 48c.

First housing sidewall 52a is generally straight, while second and third housing sidewalls 52b and 52c are generally curved or arcuate. Second and third housing sidewalls 52b and 52c are comprised of three segments apiece: a first leg 54, an opposite leg 56 and a central curved segment 58, with opposite leg 56 of second housing sidewall 52b being essentially parallel to opposite leg 56 of third housing sidewall 52c, and first leg 54 of second housing sidewall 52b and first leg 54 of third housing sidewall 52c being essentially parallel to first housing sidewall 52a.

Figure 3:
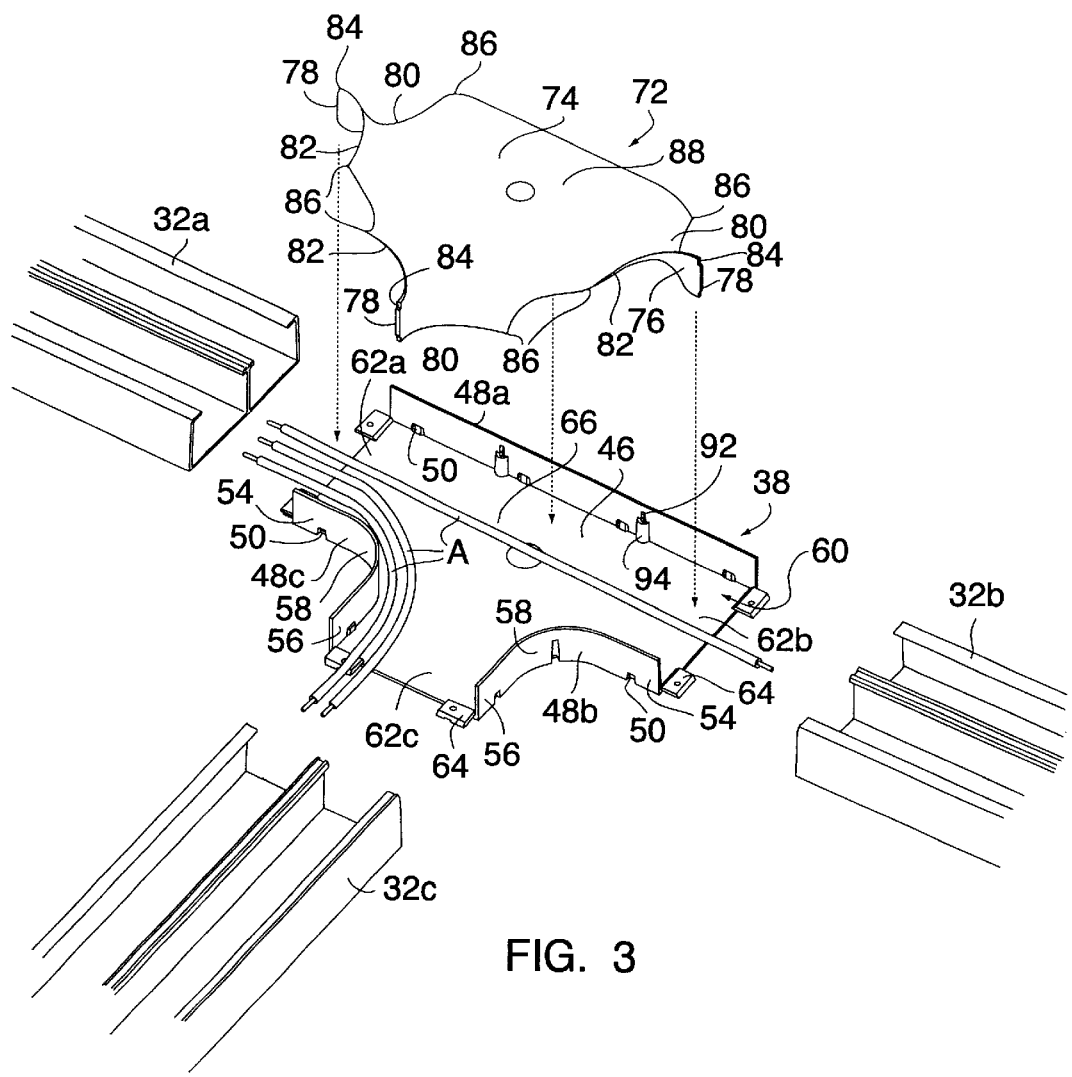
FIG. 3 shows the raceway system of FIG. 2 with the tee assembly divider removed and cables routed through the base fitting.
Figure 4:
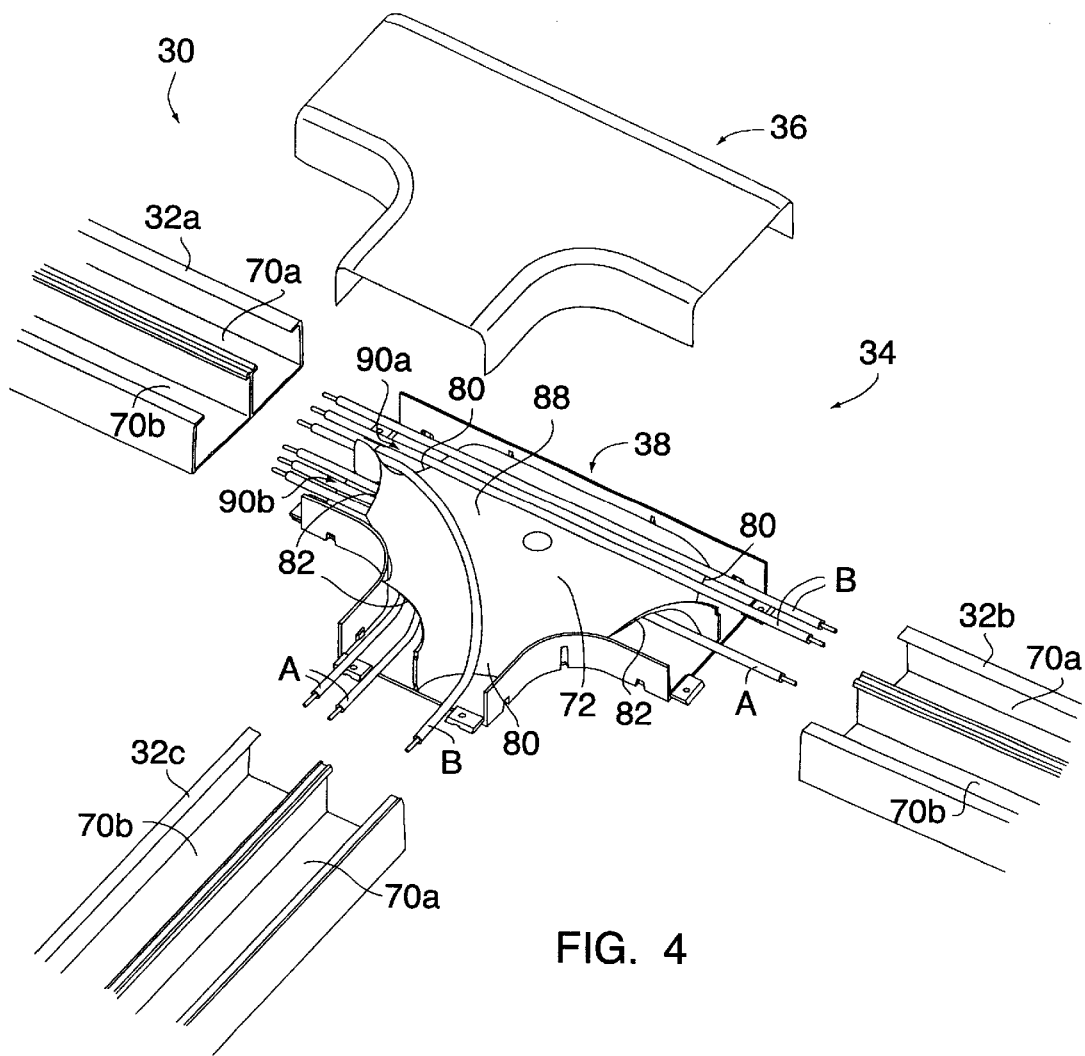
FIG. 4 shows the raceway system of FIG. 3 with the tee assembly divider in place, cables routed through a first wireway located below the divider, and cables routed through a second wireway located above the divider.
Figure 5:
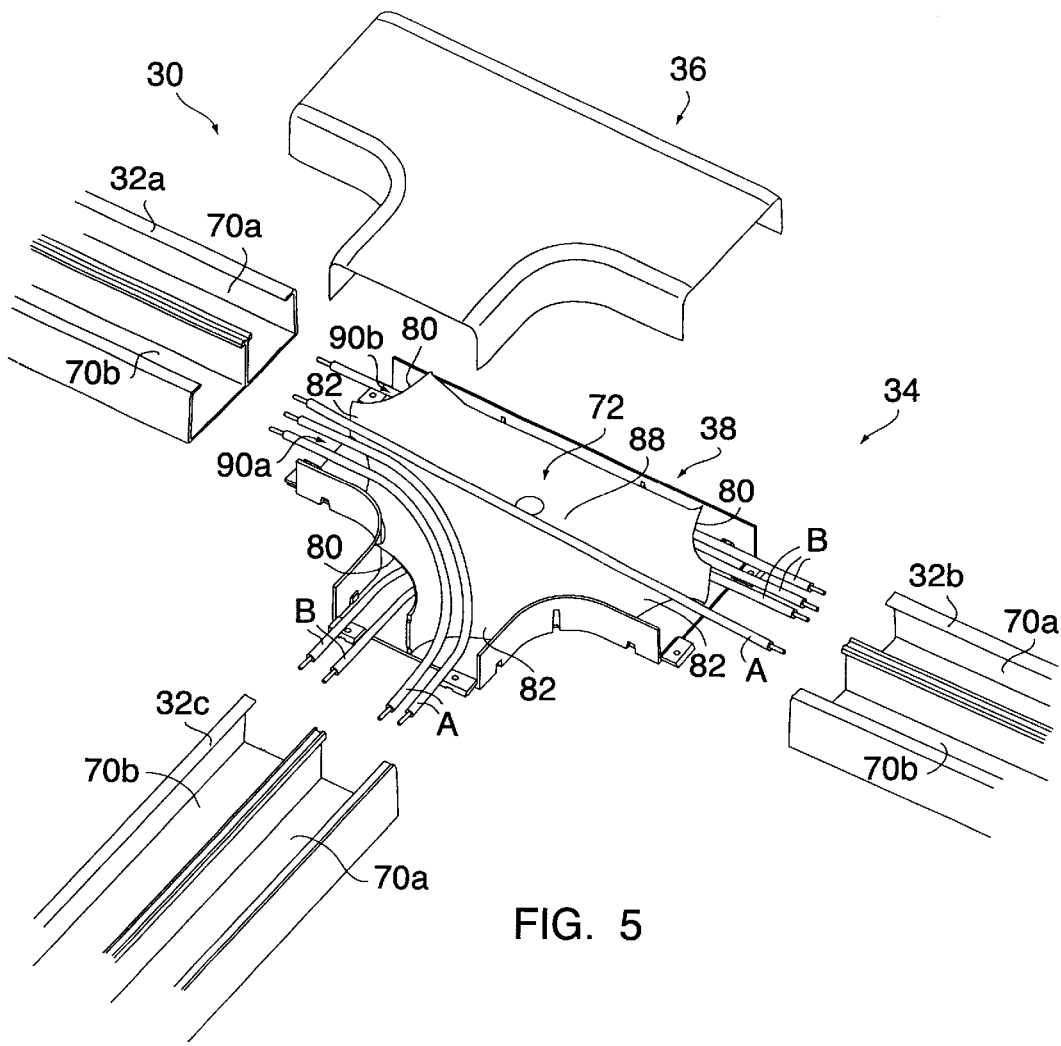
FIG. 5 shows a raceway system similar to FIG. 4 except with the tee assembly divider in a second, inverted position and cables routed through the two wireways formed based on the position of the divider.

Housing 34, with cover fitting 36 attached to base fitting 38, defines a channel 60, through which wires or cables A and B are routed (as shown in FIGS. 3–5). Housing 34 further defines first, second and third end portions 62a, 62b and 62c, the longitudinal dimensions of which are defined by the length of first leg segment 54 and opposite leg segment 56, and in which channel 60 has a uniform cross-section. First and second end portions 62a and 62b are generally aligned along the axis of the first housing sidewall 52a. Third end portion 62c is oriented perpendicular to first and second end portion 62a and 62b. First, second and third end portions 62a, 62b and 62c are adapted to receive corresponding linear raceway sections 32a, 32b and 32c. Tabs 64, 64 located on the base surface 46 of base fitting 38 protrude into a corresponding linear raceway section for securing the linear raceway section to the tee assembly 30.

Housing 34 further defines a diverging portion 66 connecting first, second and third end portions 62a, 62b and 62c. Diverging portion 66 is further defined, in part, by the first housing sidewall 52a, and curved central segments 58, 58 of the second and third housing sidewalls 52b and 52c.

The preferred embodiment of the present invention comprises two wireway channels allowing power and low voltage cables in the same raceway. Linear raceway sections 32a, 32b and 32c are each provided with an integral divider 68 which defines a first and a second wireway section 70a and 70b of substantially equal size and cross-section.

Tee assembly 30 is provided with a divider 72 which adopts the general tee shape of the channel 60. The divider has a first surface 74 and a second surface 76, and is contorted such that it has three vertical end portions 78, 78 that align with the integral dividers 68 of the linear raceway sections and run parallel to the housing sidewalls 52a, 52b and 52c. The divider 72 has three end zones culminating in and corresponding with the vertical end portions 78, 78, and which align with the first, second and third end portions 62a, 62b and 62c of the housing 34. Each end zone of the divider 72 has two flared ramps 80 and 82 which aid in positioning and securing the divider 72 within the housing 34 and allow the cables A and B to run through the tee assembly 30 with a reduced amount of contortion other than the bend required to rout the cables A and B to and through linear raceway sections. Each ramp 80, 82 has a first end 84 originating at a vertical end portion 78 and an opposite end 86 originating at a point in line with the inward edge of the corresponding end portion of the housing 62a, 62b or 62c. The first ramp 80 is inverted with relation to the second ramp 82.

The divider 72 also has a central web portion 88 substantially parallel to and intermediate the base surface 46 and top surface 40 of the housing 34. The central web portion 88 substantially spans the diverging portion 66 of the housing 34, being defined by the first housing sidewall 52a, the central curved segments 58, 58 of the second and third housing sidewalls 52b and 52c, and the first, second and third end portions 62a, 62b and 62c of the housing 34. The flared ramps 80, 82 are located on the edges of the central web portion 88 defined by the first, second and third end portions 62a, 62b and 62c, and are preferably curved so as to provide a smooth transition between the essentially flat surface of the central web portion 88 to either the top surface 40 or base surface 46 of the housing 34.

The divider 72 is positioned within the housing 34 and divides the channel 60 into two wireway spaces 90a and 90b. As is shown in FIG. 4, first wireway space 90a runs above the divider 72 with first surface 74 defining the base, and the top surface 40 of the housing 34 defining the top of first wireway space 90a. Second wireway space 90b runs below the divider 72 with second surface 76 defining the top, and the base surface 46 of the housing 34 defining the bottom of second wireway space 90b. Preferably, the divider 72 is reversible and invertable such that first surface 74 may take the place of second surface 76 in defining the second wireway space 90b, and second surface 76 may take the place of first surface 74 in defining first wireway space 90a, as is shown in FIG. 5.

In the first position of the divider 72 (FIG. 4), first wireway space 90a allows cables B to run straight along first housing sidewall 32a from wireway 70a in linear raceway 32a up flared ramp 80 along central web portion 88 and down flared ramp 80 to wireway 70a in linear raceway 32b. Also, cables B may be routed through first wireway space 90a from wireway 70a in linear raceway 32a up flared ramp 80 along central web portion 88 and down flared ramp 80 to wireway 70a in linear raceway 32c and/or from wireway 70a in linear raceway 32b up flared ramp 80 along central web portion 88 and down flared ramp 80 to wireway 70a in linear raceway 32c.

In the same configuration of the divider 72, second wireway space 90b allows cables A to run straight from wireway 70b in linear raceway 32a through the space defined by inverted flared ramp 82 under central web portion 88 and through the space defined by inverted flared ramp to wireway 82 to wireway 70b in linear raceway 32b. Also, cables A may be routed through second wireway space 90b from wireway 70b in linear raceway 32a through the space defined by inverted flared ramp 82 under central web portion 88 and through the space defined by inverted flared ramp to wireway 82 to wireway 70b in linear raceway 32c (along third housing sidewall 52c) and/or from wireway 70b in linear raceway 32b through the space defined by inverted flared ramp 82 under central web portion 88 and through the space defined by inverted flared ramp 82 to wireway 70b in linear raceway 32c.

In the second position of the divider 72 (FIG. 5), first wireway space 90a allows cables A to run straight from wireway 70b in linear raceway 32a up flared ramp 82 along central web portion 88 and down flared ramp 82 to wireway 70b in linear raceway 32b. Also, cables A may be routed through first wireway space 90a from wireway 70b in linear raceway 32a up flared ramp 82 along central web portion 88 and down flared ramp 82 to wireway 70a in linear raceway 32c and/or from wireway 70b in linear raceway 32b up flared ramp 82 along central web portion 88 and down flared ramp 82 to wireway 70a in linear raceway 32c (along second housing sidewall 52b).

In the same configuration of the divider 72, second wireway space 90b allows cables B to run straight along the first housing sidewall 52a from wireway 70a in linear raceway 32a through the space defined by inverted flared ramp 80 under central web portion 88 and through the space defined by inverted flared ramp 80 to wireway 70a in linear raceway 32b. Also, cables B may be routed through second wireway space 90b from wireway 70a in linear raceway 32a through the space defined by inverted flared ramp 80 under central web portion 88 and through the space defined by inverted flared ramp 80 to wireway 70b in linear raceway 32c and/or from wireway 70a in linear raceway 32b through the space defined by inverted flared ramp 80 under central web portion 88 and through the space defined by inverted flared ramp 80 to wireway 70b in linear raceway 32c.

Preferably, the divider 72 is detachably secured in housing 34 by securing means comprising inwardly protruding clips members 92, 92 located on the base sidewalls 48a, 48b, and 48c of base fitting 38, as shown in FIG. 7. Two clip members 92, 92 are located on first base sidewall 48a and each is aligned with a corresponding inwardly protruding shelf member 94 which supports the weight of the divider 72 to prevent the divider 72 from sagging into the wireway space 90b located beneath the divider 72. Second and third base sidewalls 48b and 48c each are provided with one clip member 92, preferably located at the center of the corresponding central curved segment 58.

While preferred embodiments have been shown and described, various modifications and substitutions may be made without departing from the spirit and scope of the invention. Accordingly, it is to be understood that the foregoing invention has been presented and described by way of illustration and not by limitation.

We claim:

1. A tee assembly defining a tee-shaped channel of a raceway system for routing cables, and comprising:
   a housing having a base, a top, and first, second and third sidewall sections, wherein said base, top and first, second and third sidewall sections define angularly-related first, second and third end portions and a diverging portion of the housing, the cross-section of said channel being uniform through each said end portion, and said diverging portion connecting said first, second and third end portions;

dividing means positioned within the housing for dividing said channel into at least two wireways and maintaining separation between said wireways such that cables routed through one wireway do not interfere with cables routed through other wireways; and said dividing means comprising a central web portion substantially parallel to and intermediate the base and top of the housing spanning the area of the diverging portion of the housing, and a plurality of ramps located on the ends of the central web portion aligned with the first, second and third end portions of the housing, wherein said ramps provide a transition between the central web portion and the housing.

2. The tee assembly of claim 1, wherein the first and second end portions are generally aligned and the third end portion is perpendicular to the first and second end portions.

3. The tee assembly of claim 2, wherein the first sidewall section is essentially straight and the second and third sidewall sections each comprise two straight leg segments connected by a curved transition section, said straight leg segments further defining the corresponding end portions and said curved transition segments defining the diverging portion of the housing.

4. The tee assembly of claim 3, wherein the curved transition segments have a radius of curvature of approximately at least two (2) inches.

5. The tee assembly of claim 1, wherein the housing further comprises means for detachably securing the dividing means within the assembly channel.

6. The tee assembly of claim 1, wherein the dividing means defines a first and a second wireway in the housing, said first and second wireways being isolated from one another.

7. The tee assembly of claim 6, further comprising first, second and third linear raceway sections received by the first, second and third end portions respectively of the housing, said first, second and third linear raceway sections having substantially the same cross-section as said first, second and third end portions.

8. The tee assembly of claim 7, wherein the first, second and third linear raceway sections have left and right wireways aligned with the first and second wireways of the housing, and wherein the dividing means is invertable such that some cables may be routed from the first linear raceway section through the housing to the wireways of the second and third linear raceway sections, and other cables may be routed from the second linear raceway sections through the housing to the wireways of the first and third linear raceway sections, and still other cables may be routed from the third linear raceway section through the housing to the wireways of the first and second linear raceway sections.

9. The tee assembly of claim 8 wherein the dividing means is so positioned that the first wireway runs between the dividing means and the top of the housing and connects the left wireways of the first, second and third raceway sections and the second wireway runs between the dividing means and the base of the housing and connects the right wireways of the first, second and third raceway sections.

10. The tee assembly of claim 8 wherein the dividing means is so positioned that the first wireway runs between the dividing means and the top of the housing and connects the left wireways of the first and second raceway sections with the right wireway of the third raceway section, and the second wireway runs between the dividing means and the base of the housing and connects the right wireways of the first and second raceway sections with the left wireway of the third raceway section.

11. The tee assembly of claim 6 comprising three sets of flared ramps, wherein a first flared ramp of each set is curved downward from said central web portion of said dividing means so as to contact the base of the housing, and a second flared ramp of each set is curved in the opposite direction from the first flared ramp in each set so as to contact the top of the housing.

12. The tee assembly of claim 1, wherein the housing comprises a base fitting having sidewalls, a cover fitting having sidewalls, and means for securing the cover fitting to the base fitting, wherein the sidewalls of the cover fitting overlap the sidewalls of the base fitting when the cover fitting is secured to the base fitting so as to define the first, second, and third sidewall sections of the housing.

* * * * *